United States Patent
Schmidt et al.

(10) Patent No.: US 10,814,580 B2
(45) Date of Patent: *Oct. 27, 2020

(54) EROSION RESISTANT AND HYDROPHOBIC ARTICLE

(71) Applicant: RAYTHEON TECHNOLOGIES CORPORATION, Farmington, CT (US)

(72) Inventors: Wayde R. Schmidt, Pomfret Center, CT (US); James T. Beals, West Hartford, CT (US); Aaron T. Nardi, East Granby, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 194 days.

This patent is subject to a terminal disclaimer.

(21) Appl. No.: 15/810,192

(22) Filed: Nov. 13, 2017

(65) Prior Publication Data

US 2018/0065334 A1    Mar. 8, 2018

Related U.S. Application Data

(63) Continuation of application No. 13/416,310, filed on Mar. 9, 2012, now Pat. No. 9,827,735.

(51) Int. Cl.
*B32B 3/00* (2006.01)
*F01D 5/28* (2006.01)
(Continued)

(52) U.S. Cl.
CPC ............ *B32B 3/00* (2013.01); *B32B 3/30* (2013.01); *B32B 7/02* (2013.01); *F01D 5/286* (2013.01);
(Continued)

(58) Field of Classification Search
CPC . F01D 5/286; F01D 5/288; B23B 3/00; B23B 3/30; B23B 7/02; F05D 2300/512; F05D 2300/514
See application file for complete search history.

(56) References Cited

U.S. PATENT DOCUMENTS

| | | | |
|---|---|---|---|
| 3,367,160 | A | 2/1968 | Sperber et al. |
| 4,227,703 | A | 10/1980 | Stalker et al. |

(Continued)

FOREIGN PATENT DOCUMENTS

| | | |
|---|---|---|
| JP | 63094001 | 4/1988 |
| WO | 9700656 | 1/1997 |
| WO | 20110147756 | 12/2011 |

OTHER PUBLICATIONS

European Supplementary Search Report for European Patent Application No. 13757723 completed Nov. 11, 2015.
(Continued)

*Primary Examiner* — Brian P Wolcott
(74) *Attorney, Agent, or Firm* — Carlson, Gaskey & Olds, P.C.

(57) ABSTRACT

A gas turbine engine includes an airfoil having a core that has a first hardness and a surface on the core. The surface includes a plurality of geometric features that have a second, greater hardness. The geometric features define a surface porosity by area percent and a corresponding surface solidity by area percent. The surface includes a ratio of the surface solidity divided by the surface porosity that is 1.8 or greater. The geometric features and the ratio establish the surface to be hydrophobic, and the second, greater hardness and the ratio establish an erosion rate of the surface that is equal to or less than an erosion rate of the core under identical erosion conditions.

14 Claims, 3 Drawing Sheets

(51) Int. Cl.
    *B32B 7/02* (2019.01)
    *B32B 3/30* (2006.01)
    *B82Y 30/00* (2011.01)
(52) U.S. Cl.
    CPC .............. *F01D 5/288* (2013.01); *B82Y 30/00* (2013.01); *F05D 2240/303* (2013.01); *F05D 2250/231* (2013.01); *F05D 2250/28* (2013.01); *F05D 2250/38* (2013.01); *F05D 2300/506* (2013.01); *F05D 2300/512* (2013.01); *F05D 2300/514* (2013.01); *Y02T 50/672* (2013.01); *Y02T 50/673* (2013.01); *Y10T 428/24174* (2015.01); *Y10T 428/24479* (2015.01); *Y10T 428/24983* (2015.01)

(56) References Cited

U.S. PATENT DOCUMENTS

| | | | | |
|---|---|---|---|---|
| 4,736,912 A | * | 4/1988 | Loebert | B63B 1/34 |
| | | | | 114/67 R |
| 5,603,603 A | | 2/1997 | Benoit et al. | |
| 6,716,539 B2 | * | 4/2004 | Subramanian | C23C 4/02 |
| | | | | 416/241 B |
| 7,371,352 B2 | * | 5/2008 | Campbell | F23C 13/00 |
| | | | | 422/177 |
| 2002/0098083 A1 | * | 7/2002 | Blangetti | C23C 8/36 |
| | | | | 415/200 |
| 2003/0056520 A1 | | 3/2003 | Campbell et al. | |
| 2003/0228441 A1 | | 12/2003 | Subramanian | |
| 2005/0008495 A1 | | 1/2005 | Wobben | |
| 2007/0031639 A1 | * | 2/2007 | Hsu | B08B 17/06 |
| | | | | 428/141 |
| 2009/0169372 A1 | | 7/2009 | Friedrich et al. | |
| 2010/0127125 A1 | | 5/2010 | Li et al. | |
| 2010/0247291 A1 | * | 9/2010 | Tholen | F01D 11/08 |
| | | | | 415/116 |
| 2010/0279084 A1 | * | 11/2010 | Biris | B81C 1/00031 |
| | | | | 428/196 |
| 2010/0319183 A1 | * | 12/2010 | Hulseman | B23H 1/06 |
| | | | | 29/592.1 |
| 2011/0089604 A1 | | 4/2011 | Hulseman et al. | |
| 2011/0151186 A1 | | 6/2011 | Lambourne | |

OTHER PUBLICATIONS

International Preliminary Report on Patentability for PCT Application No. PCT/US2013/027522 dated Sep. 18, 2014.
International Search Report and Written Opinion for International Application No. PCT/US2013/027522 completed on Jul. 12, 2013.
Singapore Search Report for SG Patent Application No. 11201405223R completed Jul. 30, 2015.

* cited by examiner

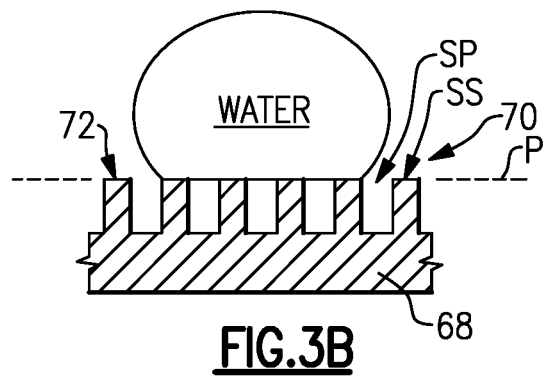
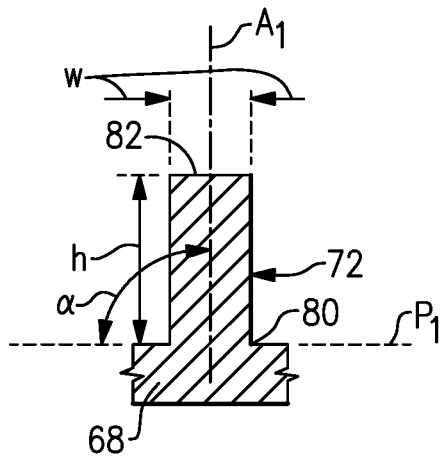
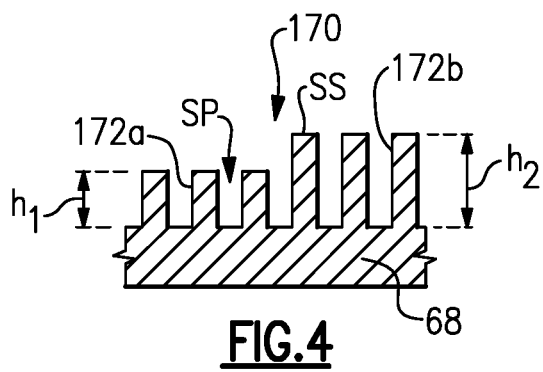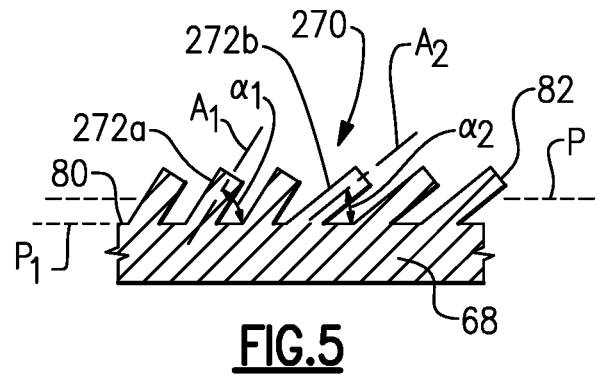
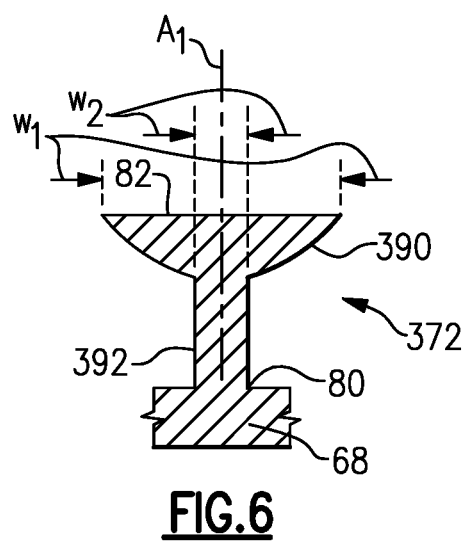

EROSION RESISTANT AND HYDROPHOBIC ARTICLE

CROSS-REFERENCE TO RELATED APPLICATION

This application is a Continuation of U.S. patent application Ser. No. 13/416,310 filed Mar. 9, 2012.

BACKGROUND

This disclosure relates to articles having modified surfaces and, more particularly, to articles that are subject to ice formation and erosive conditions.

Surfaces of aircraft, power generation structures (e.g. wind and land based turbines) or other structures may collect moisture that can freeze and debit the performance and/or durability of the structure. The structure may also be subject to environmental erosion conditions that also, over time, can debit the performance and/or durability of the structure.

To address moisture collection, a structure may include an anti-icing or icephobic coating that reduces ice or water adhesion. To address erosion, a structure may include a hard coating. However, a challenge in the design of a structure that is subject to moisture collection and erosion conditions is that coatings that provide anti-icing properties do not provide erosion protection and, vice-versa, coatings that provide erosion protection do not provide anti-icing properties.

SUMMARY

An article according to an exemplary aspect of the present disclosure includes a core having a first hardness and a surface on the core. The surface includes a plurality of geometric features having a second, greater hardness and defines a surface porosity by area percent (SP) and a surface solidity by area percent (SS). The surface also includes a ratio of SS/SP that is 1.8 or greater. The plurality of geometric features and the ratio establish the surface to be hydrophobic such that the surface would not be hydrophobic in absence of the plurality of geometric features or the ratio. The second, greater hardness and the ratio establish an erosion rate of the surface that is equal to or less than an erosion rate of the core under identical erosion conditions such that the erosion rate of the surface would not be equal to or less than the erosion rate of the core in absence of the second, greater hardness or the ratio.

In a further embodiment of the above example, the plurality of geometric features include a plurality of cylindrical elements.

In a further non-limiting embodiment of the foregoing examples, the plurality of geometric features extends along a respective central axis from a base at the core to a free end, each of the plurality of geometric features including a height (h) extending from the base to the free end and a maximum width (w) extending perpendicular to the height to define an aspect ratio w/h that is 0.004-4.

In a further non-limiting embodiment of the foregoing examples, the plurality of geometric features includes non-equivalent aspect ratios.

In a further non-limiting embodiment of the foregoing examples, the plurality of geometric features extends along a respective central axis from a base at the core to a free end in which each of the plurality of geometric features including a cross-section taken perpendicular to the central axis, and the cross-section varies in area along the central axis.

In a further non-limiting embodiment of the foregoing examples, the plurality of geometric features extends along a respective central axis from a base at the core to a free end, and each of the plurality of geometric features includes an enlarged head at the free end.

In a further non-limiting embodiment of the foregoing examples, the plurality of geometric features extends along a respective central axis from a base at the core to a free end, the base defining a reference plane and the central axis being at a non-perpendicular angle to the reference plane.

In a further non-limiting embodiment of the foregoing examples, the non-perpendicular angle is less than 90° and greater than or equal to 20°.

In a further non-limiting embodiment of the foregoing examples, the non-perpendicular angles are non-equivalent.

In a further non-limiting embodiment of the foregoing examples, the plurality of geometric features extends along a respective central axis from a base at the core to a free end, the base defining a reference plane and the free end having a surface that is sloped relative to the reference plane.

In a further non-limiting embodiment of the foregoing examples, the ratio is 15.7 or less.

In a further non-limiting embodiment of the foregoing examples, the plurality of geometric features is made of a metallic material.

In a further non-limiting embodiment of the foregoing examples, the plurality of geometric features is made of a material selected from the group consisting of polymer material, ceramic material, intermetallic material and combinations thereof.

In a further non-limiting embodiment of the foregoing examples, the core is made of a material selected from the group consisting of polymer material, metallic material, ceramic material and combinations thereof.

In a further non-limiting embodiment of the foregoing examples, the core and the plurality of geometric features are made of respective materials that have equivalent material composition.

In a further non-limiting embodiment of the foregoing examples, the core has an airfoil shape.

A gas turbine engine according to an exemplary aspect of the disclosure includes an article having a core with a first hardness and a surface on the core. The surface includes a plurality of geometric features having a second, greater hardness and defining a surface porosity by area percent (SP) and a surface solidity by area percent (SS). The surface includes a ratio of SS/SP that is 1.8 or greater. The plurality of geometric features and the ratio establish the surface to be hydrophobic such that the surface would not be hydrophobic in absence of the plurality of geometric features or the ratio. The second, greater hardness and the ratio establishing an erosion rate of the surface that is equal to or less than an erosion rate of the core under identical erosion conditions such that the erosion rate of the surface would not be equal to or less than the erosion rate of the core in absence of the second, greater hardness or the ratio.

In a further non-limiting embodiment of the above example, the gas turbine engine includes a compressor section, a combustor in fluid communication with the compressor section and a turbine section in fluid communication with the combustor.

A method of providing erosion protection and hydrophobicity in an article that has a core and a surface on the core according to an exemplary aspect of the disclosure includes establishing the surface to be hydrophobic by providing the surface with a plurality of geometric features defining a surface porosity by area percent (SP) and a surface solidity by area percent (SS) such that a ratio of SS/SP that is 1.8 or greater, wherein the surface would not be hydrophobic in absence of the plurality of geometric features or the ratio, and establishing the surface to have an erosion rate that is equal to or less than an erosion rate of the core under identical erosion conditions by providing the ratio and providing the core with a first hardness and the plurality of geometric surface features with a second, greater hardness, wherein the erosion rate of the surface would not be equal to or less than an erosion rate of the core in absence of the second, greater hardness or the ratio.

A further non-limiting embodiment of any of the above example includes establishing the surface to be hydrophobic such that the ratio is 15.7 or less.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 3B illustrates a cross-section of a modified surface.

FIG. 3C illustrates a cross-section of a geometric feature of the surface shown in FIG. 3B.

FIG. 4 illustrates a cross-section of another example modified surface.

FIG. 5 illustrates a cross-section of another example modified surface.

FIG. 6 illustrates a cross-section of a geometric feature having an enlarged head.

DETAILED DESCRIPTION OF THE PREFERRED EMBODIMENT

Figure 1:
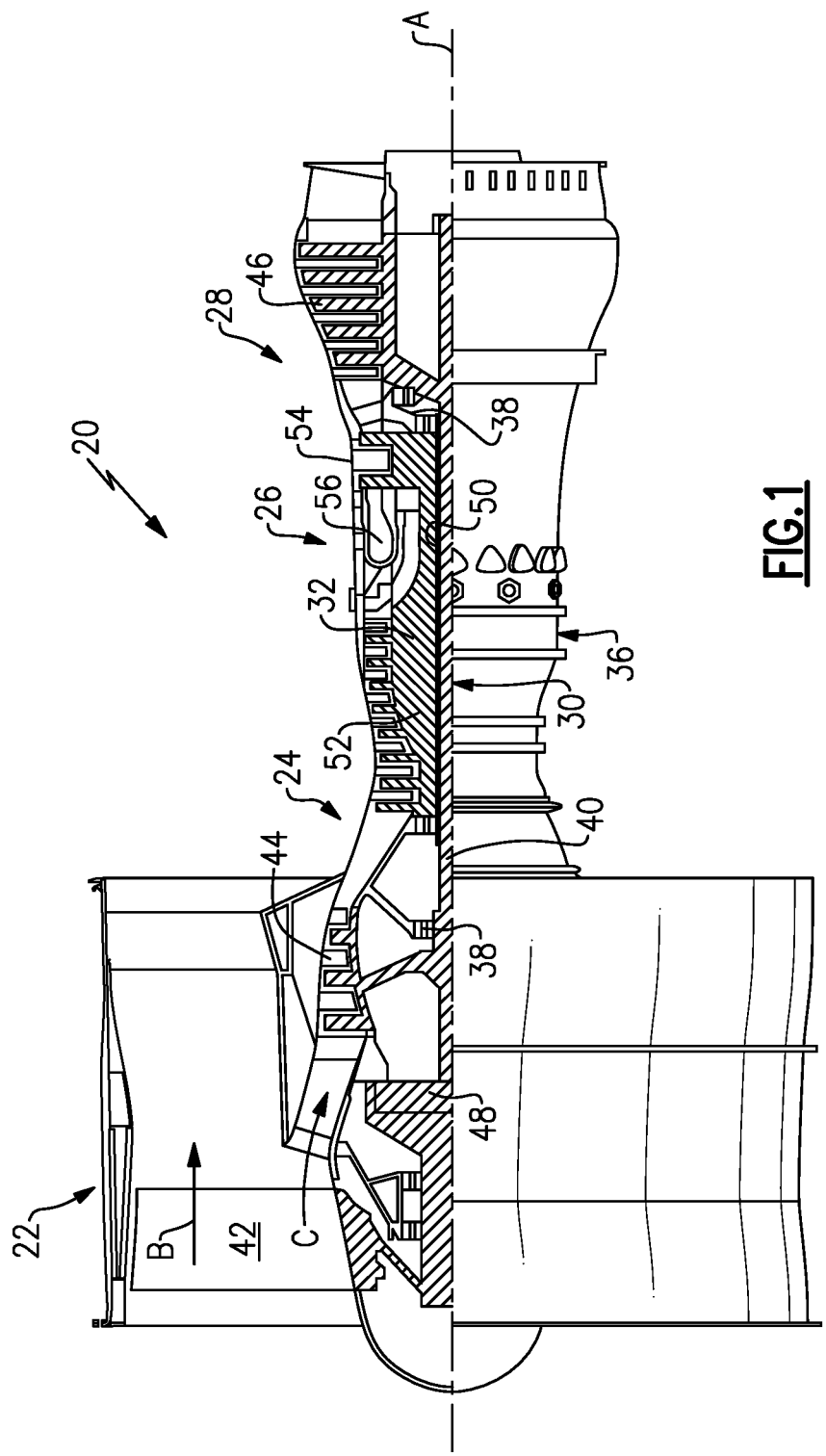
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path while the compressor section 24 drives air along a core flow path for compression and communication into the combustor section 26 then expansion through the turbine section 28. Although depicted as a turbofan gas turbine engine in the disclosed non-limiting embodiment, it is to be understood that this disclosure is not limited to turbofans and the examples herein may be applied to other types of turbine engines, including three-spool architectures and ground-based turbines, or to other types of structures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

For example, at least one of the fan section 22, the compressor section 24 or the turbine section may include a structure, such as an airfoil blade or vane (e.g., fan exit guide vanes), casing or housing, nose cone or the like that is subject to moisture and ice accumulation and erosion conditions. Other structures that are subject to moisture and ice accumulation and erosion conditions may include any structure that has a leading edge arranged to receive a gas flow.

Figure 2:
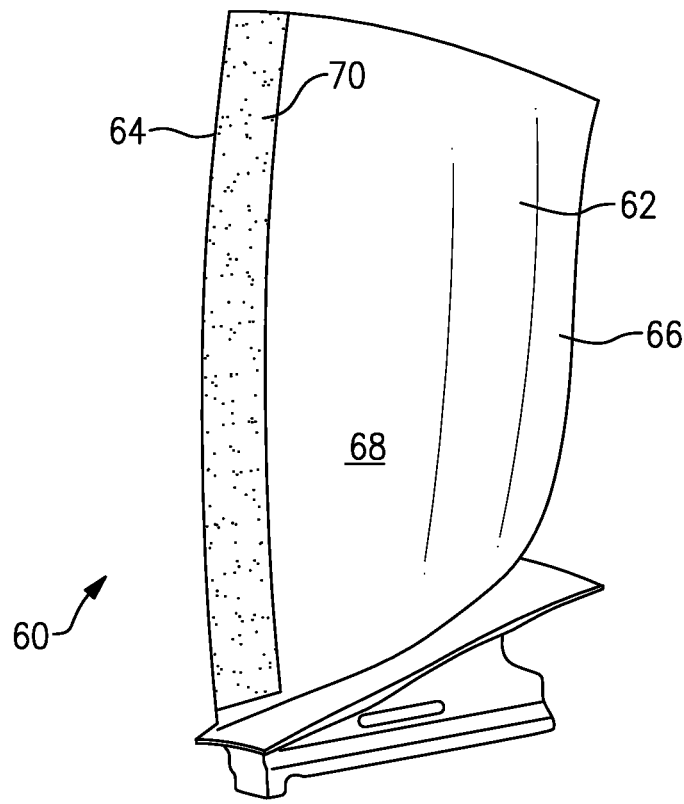
FIG. 2 illustrates an example airfoil having a modified surface.

FIG. 2 illustrates a perspective view of an example airfoil 60, which in this example is a rotatable blade. It is to be understood, however, that the airfoil 60 may alternatively be a vane or other structure that includes a leading edge that is subject to moisture or ice accumulation and erosion conditions.

In this example, the airfoil 60 includes an airfoil body 62 that extends between a leading edge 64 and a trailing edge 66 with regard to gas flow over the airfoil 60. In general, the airfoil body 62 has a wing-like shape to provide a reaction force via Bernoulli's principle with regard to airflow over the airfoil 60. The airfoil 60 includes a core 68 and a surface 70 on the core 68. As will be described in more detail below, the surface 70 is modified on a micro- or nano-scale to enhance the anti-icing properties and erosion resistance at the leading edge 64 of the airfoil 60. In this example, only the leading edge 64 has the modified surface 70, and the remaining surface is generally smooth or unmodified. The modification at the surface 70 enables water/ice and erosion management, while the small scale of the modification does not significantly influence or debit aerodynamics.

Figure 3A:
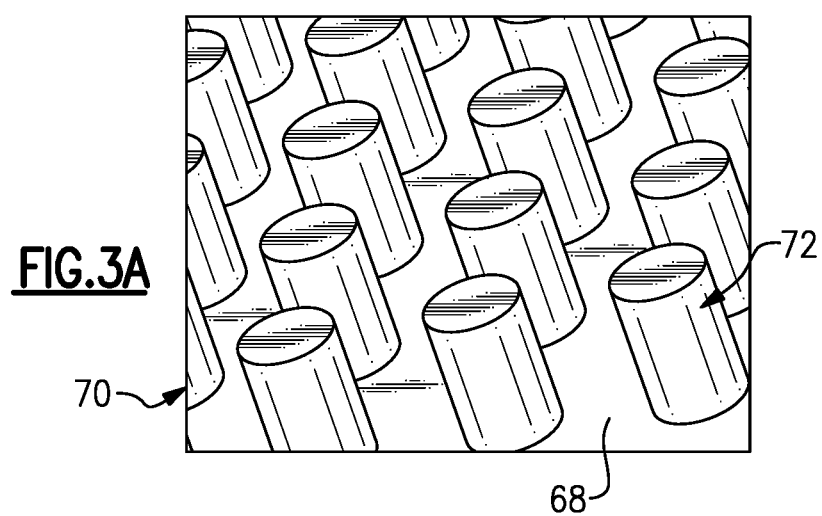
FIG. 3A illustrates a perspective, expanded view of a portion of a modified surface.

FIG. 3A illustrates a perspective, expanded view of a portion of the surface 70 and FIG. 3B illustrates a cross-sectional view of a portion of the surface 70. The surface 70 is modified to include a plurality of geometric features 72 that generally extend or project from the core 68. The geometric features 72 may be formed on the core 68 by removing portions of the core 68 such as by selective chemical etching, by reforming a portion of the core 68 through a mechanical deformation process such as embossing or by using a deposition technique, such as cold spraying. Further surface treatments or coating may optionally be applied to the geometric features 72. In this example, the geometric features 72 are cylindrical, although it is to be understood that other geometric shapes may alternatively be used.

With regard to a plane P that extends generally parallel to the core 68 and through each of the geometric features 72, the geometric features 72 define a surface porosity that is represented by an area percent (SP) and a corresponding surface solidity that is represented by an area percent (SS). The surface solidity is the percentage of solid surface in the plane P, and the surface porosity is the percentage of open area between the geometric features 72 in the plane P. Although the plane P is shown as being flush with the tips of the geometric features 72, the plane P may alternatively be defined at other heights above the core 68 and which are generally parallel to the core 68 and cut through the full cross-sections of the geometric features 72.

The geometric features 72 define a ratio of the surface solidity by area percent SS and the surface porosity by area percent SP such that SS/SP (surface solidity percent divided by the surface porosity percent) is 1.8 or greater. In a further example, the ratio is less than 15.7. The presence of the geometric features 72 in combination with the given ratio renders the surface 70 hydrophobic such that water droplets on the surface 70 bead up rather than wet the surface 70. As is known, a water droplet on a surface forms a contact angle with the surface. In this example, the contact angle of the water droplet on the surface 70 is about 90°-120° and the surface 70 is thus considered to be hydrophobic. The combination of the geometric features 72 and the ratio contribute to the hydrophobicity of the surface 70 such that the surface 70 would not be hydrophobic in absence of the geometric features 72 or in absence of the ratio. Thus, although other factors may influence hydrophobicity, the geometric features 72 and the given ratio are necessary to render the surface 70 hydrophobic.

The core 68 has a first hardness that is generally defined by the material and processing history of the core 68. The plurality of geometric features 72 has a second, greater hardness with regard to the first hardness of the core 68. The second hardness is defined by the material of the geometric features 72 and the processing technique by which the geometric features 72 are formed on the core 68. As an example, the core 68 is made of a polymer material, a metallic material, a ceramic material, or combinations thereof, such as composites. The geometric features 72 are made of another polymer material, a ceramic material, an intermetallic material, a metallic material, or combinations thereof, such as composites. In a further example, the core 68 is a metallic material and the geometric features 72 are a metallic material, such as an essentially pure material or an alloy, based on tungsten, nickel, tantalum, niobium, titanium or iron.

In a further example, the core 68 and the plurality of geometric features 72 are made of respective materials that have equivalent material composition, such as an equivalent metallic alloy composition and the difference between the first hardness and the second hardness is due to processing.

Additionally, the second, greater hardness of the geometric features 72 and the ratio establish an erosion rate of the surface 70 that is equal to or less than an erosion rate of the core 68 under identical erosion conditions. An illustrative, but non-limiting example of an experimental erosion condition is to deliver controlled particulate matter (e.g. 50/70 mesh quartz) at a velocity of 500-1000 ft/sec to impact the test surface. Practically, erosion can be caused by interaction with solid particles, such as sand or ice, or fluid droplets, such as water or a combination of solid and fluid particles. For example, the air that moves over the airfoil 60 may contain particulate matter, such as sand. The size of the sand particles typically ranges from about 0.1 to 2000 microns and more typically from about 20 to 30 microns in diameter. If the air contains sand, the sand impinges upon the airfoil 60, thereby causing abrasion to at least to portions thereof. Unless the airfoil 60 is adequately protected, such repetitive abrasive contact can eventually cause the airfoil 60 to erode.

The potential for erosion also exists if the air moving over the airfoil 60 includes water droplets. The size of water droplets ranges from about 1000 to 4000 microns and is typically about 2000 microns in diameter. Although the size of the water droplets is typically greater than the size of sand, under high velocity conditions, water droplets may behave similar to sand, thereby causing erosion.

Moreover, the combination of rain and sand can exacerbate the amount of abrasion and/or erosion. As a result, air that includes both rain and sand has the potential for increasing erosion.

Thus, the geometric features 72 enhance erosion resistance of the surface 70. Similar to the hydrophobicity, the erosion rate of the surface 70 would not be equal to or less than the erosion rate of the core 68 in absence of the second, greater hardness or absence of the ratio. Thus, the second hardness and ratio are necessary to establish the erosion rate of the surface 70 that is less than the erosion rate of the core 68. Thus, the disclosed surface 70 combines the attributes of the presence of the geometric features 72, the second hardness and the ratio to achieve hydrophobicity and erosion resistance relative to the core 68.

FIG. 3C illustrates a cross-section of one of the geometric features 72 that is representative of the plurality of geometric features 72. The geometric feature 72 extends along a central axis $A_1$ between a base 80 at the core 68 and a free end 82. The base 80 defines a reference plane $P_1$ that is generally parallel to the core 68. The central axis $A_1$ forms an angle α with the reference plane $P_1$ of the base 80. In this example, the central axis $A_1$ is perpendicular to the reference plane $P_1$ within +/−5°.

The geometric feature 72 defines a height (h) between the base 80 and the tip of the free end 82 and a maximum width (w) along a direction that is perpendicular to the central axis $A_1$. For the cylindrical shape, the maximum width is the diameter of the cylinder. It is to be understood, however, that the geometric features 72 may alternatively have other shapes, such as a geometric shape with a polygonal cross-section.

The maximum width and the height define an aspect ratio w/h for each of the geometric features 72. In one example, the aspect ratio w/h is 0.004-4. In a further example, the maximum width of the geometric feature 72 is from 10 nanometers to 1000 micrometers.

FIG. 4 illustrates a modified example that includes a surface 170. In this disclosure, like reference numerals designate like elements where appropriate and reference numerals with the addition of one-hundred or multiples thereof designate modified elements that are understood to incorporate the same features and benefits of the corresponding elements. As shown, the surface 170 includes a plurality of geometric features 172 that include first geometric features 172a and second geometric features 172b. The first geometric features 172a define a height $h_1$ and the second geometric features 172b define a height $h_2$ that is greater than $h_1$. In this example, the widths of the first geometric features 172a and the second geometric features 172b are equivalent and thus the first geometric features 172a have a different aspect ratio than the second geometric features 172b.

The difference in aspect ratio between the first geometric features 172a and the second geometric features 172b is used to adjust erosion resistance. For example, due to the greater height $h_2$ of the second geometric features 172b compared to the height $h_1$ of the first geometric features 172a, portions of the surface 170 that include the second geometric features 172b can endure a greater amount of erosion before the second geometric features 172b would be eroded down to the core 68. Thus, the surface 170 can be tailored to include the second geometric features 172b in areas that are expected to be subject to greater erosion.

FIG. 5 illustrates another modified example of a surface 270. As shown, the surface 270 has a plurality of geometric features 272, including first geometric features 272a and second geometric features 272b. The first geometric features 272a extend along respective central axes $A_1$, and the second geometric features 272b extend along respective axes $A_2$. The central axes $A_1$ and $A_2$ form respective angles $\alpha_1$ and $\alpha_2$ with the plane $P_1$ of the base 80. In this example, the surfaces at the free ends 82 are therefore sloped with regard to the reference plane $P_1$. The angles $\alpha_1$ and $\alpha_2$ are non-equivalent to each other and are non-perpendicular with regard to the plane P. In one example, the angles $\alpha_1$ and $\alpha_2$ are less than 90° and greater than or equal to 20°.

The difference in the angles $\alpha_1$ and $\alpha_2$ between the first geometric features 272a and the second geometric features 272b is used to adjust erosion resistance between different portions of the surface 270. For example, due to the greater amount of solid material in the plane P of the second geometric features 272b compared to the amount of solid material in the plane P of the first geometric features 272a, portions of the surface 270 that include the second geometric features 272b can endure a greater amount of erosion before the second geometric features 272b would be eroded down to the core 68. Thus, the surface 270 can be tailored to include the second geometric features 272b in areas that are expected to be subject to greater erosion. Additionally or alternatively, the difference in the angles $\alpha_1$ and $\alpha_2$ between the first geometric features 272a and the second geometric features 272b is used to tailor the surface 270 to different gas flow over different portions of the surface 270 and/or to manage water flow and ice accumulation in different portions. For example, the angles $\alpha_1$ and $\alpha_2$ are selected such that the central axes $A_1$ more closely align with a direction of impinging gas flow on the surface 270.

FIG. 6 illustrates another modified example of a geometric feature 372 that is representative of a plurality of geometric features 372. In this example, the geometric feature 372 has a non-uniform cross-sectional area along the central axis $A_1$ and includes an enlarged head 390 at the free end 82. The enlarged head 390 is supported on a cylindrical shank 392. The enlarged head 390 defines a maximum width $w_1$ and the cylindrical shank 392 defines a maximum width $w_2$ that is less than the maximum width $w_1$ of the head 390. The enlarged head 390 provides an increased surface solidity by area percent SS at the free end 82 and thus may also be used to enhance erosion resistance. For instance, the surface 70, 170, 270 can be tailored to include the geometric feature 372 in areas that are expected to be subject to greater erosion.

As described herein, FIGS. 3A and 3B show the geometric features 72 with the aspect ratio w/h of 0.004-4 and the perpendicular angle $\alpha$, FIG. 4 shows the first geometric features 172a and the geometric features 172b having different aspect ratios, FIG. 5 shows the first geometric features 272a and the geometric features 272b having different angles and FIG. 6 shows the geometric feature with a non-uniform cross-section. Although the attributes with respect to these Figures are presented separately for the purpose of description, it is to be understood that the attributes may be used in any combination, such as different aspect ratios and different angles, different angles and non-uniform cross-sections, etc.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
an airfoil having leading and trailing edges, the airfoil including a core having a first hardness and a surface at the leading edge on the core, the surface including a plurality of geometric features having a second, greater hardness and defining a surface porosity by area percent (SP) and a surface solidity by area percent (SS), the surface including a ratio of SS/SP that is 1.8 or greater, the plurality of geometric features and the ratio establishing the surface to be hydrophobic such that the surface would not be hydrophobic in absence of the plurality of geometric features or the ratio, and the second, greater hardness and the ratio establishing an erosion rate of the surface that is equal to or less than an erosion rate of the core under identical erosion conditions such that the erosion rate of the surface would not be equal to or less than an erosion rate of the core in absence of the second, greater hardness or the ratio, wherein each of the plurality of geometric features extends along a respective central axis from a base at the core to a free end, the base defining a reference plane and the central axis being at a non-perpendicular angle to the reference plane, and the non-perpendicular angles are non-equivalent.

2. The gas turbine engine as recited in claim 1, including a compressor section, a combustor in fluid communication with the compressor section and a turbine section in fluid communication with the combustor.

3. The gas turbine engine as recited in claim 1, wherein a remaining surface of the airfoil excludes the plurality of geometric features.

4. The gas turbine engine as recited in claim 3, wherein the remaining surface is smooth.

5. The gas turbine engine as recited in claim 1, wherein each of the plurality of geometric features including a height (h) extending from the base to the free end and a maximum width (w) extending perpendicular to the height to define an aspect ratio w/h that is 0.004-4, wherein the plurality of geometric features include non-equivalent aspect ratios.

6. The gas turbine engine as recited in claim 1, wherein the plurality of geometric features include a plurality of cylindrical elements.

7. The gas turbine engine as recited in claim 1, wherein each of the plurality of geometric features includes an enlarged head at the free end.

8. The gas turbine engine as recited in claim 1, wherein the non-perpendicular angle is less than 90° and greater than or equal to 20°.

9. The gas turbine engine as recited in claim 1, wherein the base defines a reference plane and the free end has a surface that is sloped relative to the reference plane.

10. The gas turbine engine as recited in claim 1, wherein the ratio is 15.7 or less.

11. The gas turbine engine as recited in claim 1, wherein the plurality of geometric features are made of a metallic material.

12. The gas turbine engine as recited in claim 1, wherein the plurality of geometric features are formed of ceramic material or intermetallic material.

13. A method of providing erosion protection and hydrophobicity in an article, the method comprising:

in an article that has a core and a surface on the core, establishing the surface to be hydrophobic by providing the surface with a plurality of geometric features defining a surface porosity by area percent (SP) and a surface solidity by area percent (SS) such that a ratio of SS/SP that is 1.8 or greater, wherein the surface would not be hydrophobic in absence of the plurality of geometric features or the ratio, wherein each of the plurality of geometric features extends along a respective central axis from a base at the core to a free end, the base defining a reference plane and the central axis being at a non-perpendicular angle to the reference plane, and the non-perpendicular angles are non-equivalent; and establishing the surface to have an erosion rate that is equal to or less than an erosion rate of the core under identical erosion conditions by providing the ratio and providing the core with a first hardness and the plurality of geometric surface features with a second, greater hardness, wherein the erosion rate of the surface would not be equal to or less than an erosion rate of the core in absence of the second, greater hardness or the ratio.

14. The method as recited in claim 13, including establishing the surface to be hydrophobic such that the ratio is 15.7 or less.

* * * * *